Dec. 17, 1963  E. M. PATTERSON  3,114,407
ANTI-SKID DEVICE FOR AUTOMOBILES
Filed Sept. 26, 1962  2 Sheets-Sheet 1

INVENTOR.
Eula Mae Patterson
BY John A. Hamilton
Attorney.

Dec. 17, 1963  E. M. PATTERSON  3,114,407
ANTI-SKID DEVICE FOR AUTOMOBILES
Filed Sept. 26, 1962  2 Sheets-Sheet 2
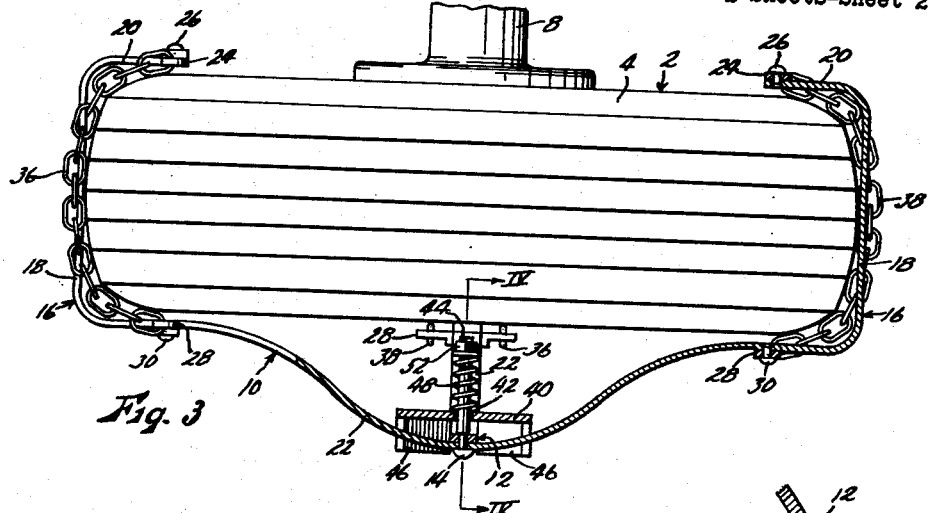
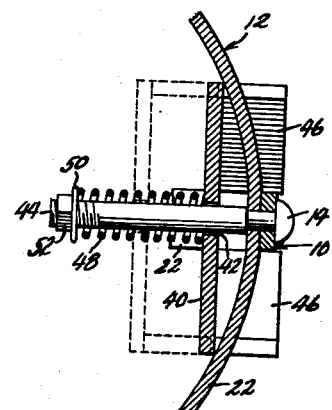
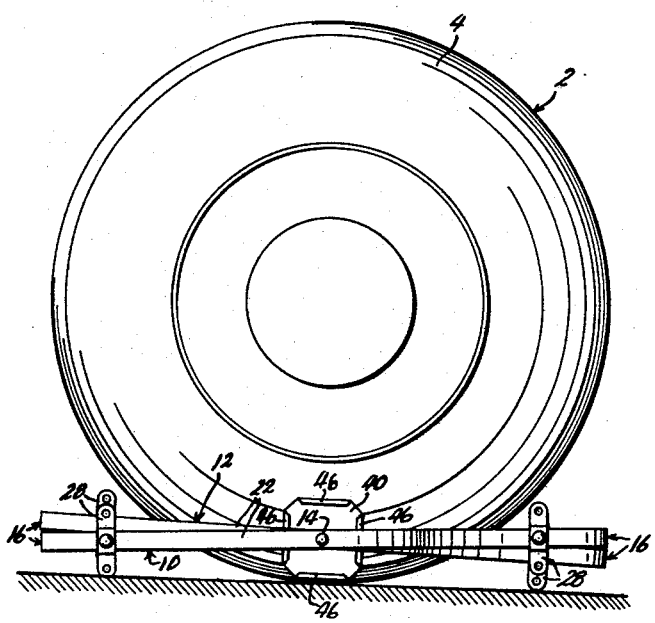
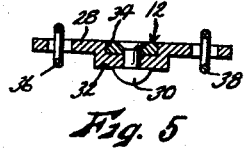
INVENTOR.
Eula Mae Patterson
BY
John A. Hamilton
Attorney.

United States Patent Office 3,114,407
Patented Dec. 17, 1963

3,114,407
ANTI-SKID DEVICE FOR AUTOMOBILES
Eula Mae Patterson, 8908 Cherokee Lane,
Leawood, Kans.
Filed Sept. 26, 1962, Ser. No. 226,237
3 Claims. (Cl. 152—213)

This application is a continuation-in-part of my co-pending application Serial No. 118,135, filed June 19, 1961 and entitled "Tire Chains," now abandoned.

This invention relates to new and useful improvements in anti-skid devices for automobiles, and has particular reference to that class of anti-skid devices commonly known as tire chains.

The principal object of the present invention is the provision of tire chains which may be either applied or removed quickly and easily by a single person, without necessity of either jacking the wheel up off the ground or of arranging the chains on the ground and driving the wheel onto the chains, and without necessity of reaching to the inner surface of the wheel to make chain connections or for any other purpose. Some or all of these operations are inherently necessary in the use of nearly all standard tire chain sets in common usage, and are disadvantageous in that they require special equipment not available in isolated locations, or require movement of the car which cannot be done if the automobile is already mired or stuck, or that a person's clothing is badly soiled by reaching back of the wheel or lying on the ground, or that a person must be exposed to inclement weather for unduly long periods of time. The present invention overcomes all of these disadvantages.

Another object of the present invention is the provision of tire chains of the character described having novel means for maintaining the chains snug and tight on the wheel at all times, particularly as the tire thereof is alternately compressed and released by direct contact of each portion thereof with the ground.

Other objects are simplicity and economy of construction, efficiency and dependability of operation, and adaptability for use with many different sizes and styles of automotive wheels.

Figure 1:
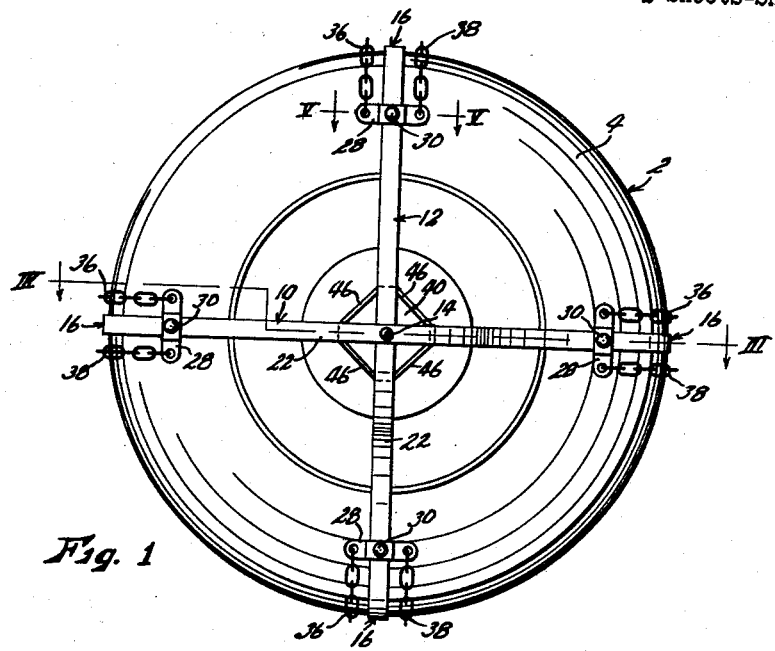
Figure 2:
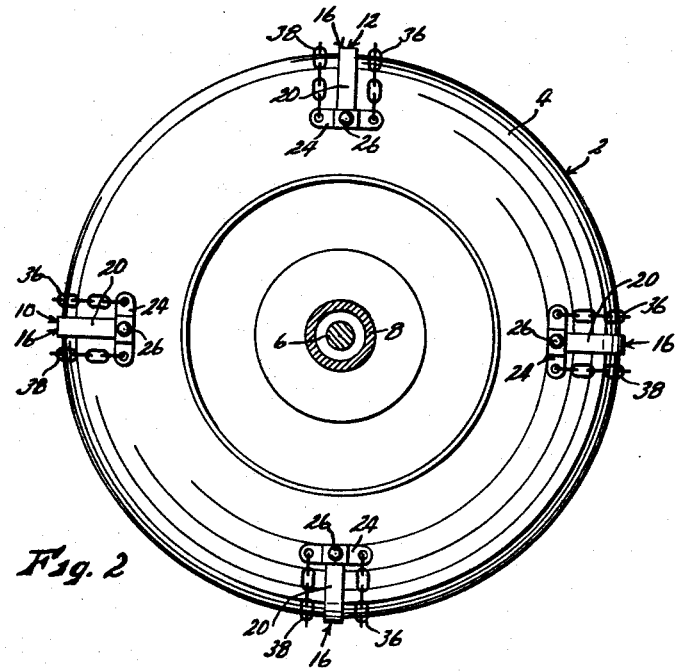

With these objects in view, as well as other objects which will appear in the course of the specification, reference will be had to the accompanying drawing, wherein:

FIG. 1 is a side elevational view of the outer face of an automobile wheel, with a set of tire chains embodying the present invention applied operatively thereto, FIG. 2 is a side elevational view of the inner face of the wheel as shown in FIG. 1, FIG. 3 is an enlarged sectional view taken on line III—III of FIG. 1, with parts left in elevation, FIG. 4 is an enlarged fragmentary sectional view taken on line IV—IV of FIG. 3, showing the lock plate in its operative position in solid lines and in its inoperative position in dotted lines, FIG. 5 is an enlarged sectional view taken on line V—V of FIG. 1, and FIG. 6 is a view similar to FIG. 1 but with the tire chain device folded and in position to be applied to the wheel, with the tread chains omitted.

Like reference numerals apply to similar parts throughout the several views, and the numeral 2 applies to an automobile wheel having a tire 4 and being mounted on an axle 6 (see FIG. 2) carried in an axle housing 8, all in the usual manner. The tire chain device forming the subject matter of the present invention includes a pair of elongated bars 10 and 12 comprising strips of spring steel each adapted to extend diametrically across the outer face of wheel 2, as best shown in FIG. 1. Said bars are pivoted together at their midpoints by a rivet 14. Each end of each bar is bent to form a hook 16 extending generally at right angles to its associated bar, the hook portions of each bar opening toward each other in opposed relation, and being adapted to bridge the tread of tire 4 at diametrically opposite points thereof. Said hooks, which may be either integral with or affixed to bars 10 and 12, each include a transverse portion 18 (see FIG. 3) engaging the tire tread, and an inner leg 20 (see FIG. 2) which extends parallel to the associated bar 10 or 12 but is of abbreviated length, extending inwardly along the inner face of the wheel only to about the thickest part of the tire. It will be noted that the central portions 22 of bars 10 and 12 are bowed outwardly, and that they are pre-formed to shape such that said bowed portions must be somewhat flattened or extended to separate hooks 16 thereof sufficiently to allow them to engage diametrically opposite points of the tire as shown. Thus the resilience of bars 10 and 12 serves to hold hooks 16 in snug engagement with the tire at all times.

A short cross bar 24 is secured at its midpoint to the extreme free end of inner leg 20 of each hook 16, by a rivet 26, and extends at right angles thereto. Similarly, a short cross bar 28 is secured to each bar 10 or 12 immediately opposite each of cross bars 24, by means of a rivet 30. As best shown in FIG. 5, each cross bar 24 and 28 is positively prevented from rotating about its attaching rivet by having a portion thereof transversely offset as indicated at 32, whereby to form a groove 34 in which the associated arm 10 or 12 is snugly engaged. A pair of tread chains 36 and 38 extends respectively between corresponding ends of the two cross bars 24 and 28 associated with each of hooks 16, the end links of said chains being engaged in perforations formed therefor in said cross bars. Thus said chains also bridge the tire tread, in generally parallel relation to but at opposite sides of the associated hook 16. They provide anti-skid traction for the tire against the ground, in the usual manner, in addition to the traction provided by the hooks themselves. The specific design of the links in these tread chains is not pertinent to the present invention.

Relative pivotal movement of bars 10 and 12 on rivet 14 is controlled by a lock mechanism including a lock plate 40 disposed in a plane at right angles to rivet 14 and having a hole 42 formed centrally therein mounted slidably over an inward axial extension 44 of said rivet. Rigidly attached to said lock plate, or integral therewith, are four lock fingers 46 extending outwardly from said plate in a direction parallel to rivet 14. Said fingers are so proportioned that when bars 10 and 12 are disposed at right angled relation as shown in FIG. 1, said fingers engage snugly in the successive spaces between said arms, whereby to lock said arms against relative pivotal movement. The lock mechanism is resiliently biased toward this operative position by a compression spring 48 disposed about rivet extension 44 and compressed between lock plate 40 and a washer 50 and lock nut 52 secured on the inner end of said extension. By pressing lock plate inwardly against spring 48, as shown in dotted lines in FIG. 4, fingers 46 are withdrawn from between the bars 10 and 12, and said bars may then be relatively pivoted about rivet 14.

In applying the device to a wheel, lock 40—46 is first rendered inoperative as just described, and bars 10 and 12 are pivotally folded into a nearly parallel relation as shown in FIG. 6. Then, also as shown in FIG. 6, the two bars are held in chordal relation to the lower portion of the wheel, with hooks 16 extending toward the wheel, and moved toward the wheel until hooks 16 are aligned with the tread of tire 4. Tread chains 36 and 38 are omitted from FIG. 6 to avoid confusion. A slight flattening of bowed portions 22 of the bars may be required to provide sufficient separation of hooks 16 to be aligned with the tire tread as just described, and this may be done manually. The two bars 10 and 12 are then pivoted to a relatively right-angled position as shown in FIG. 1, whereupon lock fingers 46 are extended between the bars to lock them in position against further pivoting. The hooks 16 and their related tread chains 36 and 38 are then spaced at equal angular intervals around the tire.

As has been previously described, the bowed portions 22 of bars 10 and 12 are pre-formed to such a shape that they normally would hold the opposite hooks 16 somewhat closer together than the diameter of tire 4. Thus in applying the device as described above, the bowed portions 22 must be somewhat flattened and extended, and the resulting resilient tension of said bars holds hooks 16, and tread chains 36 and 38, firmly against the tire at all times, whereby to prevent rattling, and to improve efficiency of their anti-skid function. This is particularly important when one of hooks 16 engages the ground and the corresponding portion of tire 4 is compressed and deformed by the weight of the automobile. This reduces the vertical height of the tire, and the hook 16 at the top of the wheel would be forced away from the tire if it were not for the fact that the bar 10 or 12 connecting the two hooks automatically contracts in length to absorb the reduction of vertical tire height. The device may be removed from a wheel, so long as the automobile is brought to rest with none of hooks 16 or chains 36 and 38 in direct engagement with the ground, simply by pressing lock plate 40 inwardly to withdraw fingers 46 from between bars 10 and 12, and then pivoting said bars to the nearly parallel relation shown in FIG. 6.

While I have shown and described a specific embodiment of my invention, it will be readily apparent that many minor changes of construction and operation could be made without departing from the spirit of the invention as defined by the scope of the appended claims. By way of example, only, three or more spring bars could be utilized in place of the two bars 10 and 12 shown, in order to provide a greater number of traction points around the periphery of the tire. However, the structure actually shown has proven quite efficient. Also, anti-skid devices other than chains 36 and 38 could be applied to hooks 16. Said hooks of course serve as anti-skid devices in and of themselves, and as such their efficiency could be enhanced by broadening them and roughening their outer surfaces or applying cleats thereto.

What I claim as new and desire to protect by Letters Patent is:

1. An anti-skid device for an automobile wheel comprising:
   a. a plurality of elongated bars adapted to be disposed adjacent the outer face of said wheel in diametrically extending relationship thereto,
   b. means connecting said bars together at their mid-points for relative pivotal movement about an axis at right angles to the longitudinal extent of said bars,
   c. a pair of transversely projecting hooks carried respectively at the opposite ends of each of said bars, and adapted to bridge transversely the periphery of said wheel at diametrically opposite points thereof, the mid-portion of each of said bars, intermediate the hooks thereof, being bowed transversely in a direction opposite to the direction of extension of said hooks, said bowed portion being pre-formed to such a shape that, when relaxed, it positions said hooks apart by a distance less than the diameter of the wheel to which said device is to be applied, and
   d. releasable lock means operable to secure said bars against relative pivotal movement when they are arranged to extend from the pivotal connection thereof at substantially equal angular intervals.

2. An anti-skid device for an automobile wheel comprising:
   a. a plurality of elongated bars adapted to be disposed adjacent the outer face of said wheel in diametrically extending relationship thereto,
   b. means connecting said bars together at their mid-points for relative pivotal movement about an axis at right angles to the longitudinal extent of said bars,
   c. a pair of transversely projecting hooks carried respectively at the opposite ends of each of said bars, and adapted to bridge transversely the periphery of said wheel at diametrically opposite points thereof, and
   d. releasable lock means operable to secure said bars against relative pivotal movement when they are arranged to extend from the pivotal connection thereof at substantially equal angular intervals, said lock means comprising:
      (1) a lock plate carried by said bars for movement parallel to the axis of the pivotal connection therebetween, and
      (2) a plurality of fingers affixed to said lock plate and extending therefrom in a direction parallel to the movement thereof, said fingers being adapted by movement of said lock plate to be moved to a locked position extending between said bars in spaced relation from the pivotal axis thereof, whereby said bars are secured against relative pivotal movement, or to an unlocked position withdrawn from between said bars, whereby said bars are freed for relative pivotal movement.

3. An anti-skid device for an automobile wheel comprising:
   a. a plurality of elongated bars adapted to be disposed adjacent the outer face of said wheel in diametrically extending relationship thereto,
   b. means connecting said bars together at their mid-points for relative pivotal movement about an axis at right angles to the longitudinal extent of said bars,
   c. a pair of transversely projecting hooks carried respectively at the opposite ends of each of said bars, and adapted to bridge transversely the periphery of said wheel at diametrically opposite points thereof, and
   d. releasable lock means operable to secure said bars against relative pivotal movement when they are arranged to extend from the pivotal connection thereof at substantially equal angular intervals, said lock means comprising:
      (1) a lock plate carried by said bars for movement parallel to the axis of the pivotal connection therebetween,
      (2) a plurality of fingers affixed to said lock plate and extending therefrom in a direction parallel to the movement thereof, said fingers being adapted by movement of said lock plate to be moved to a locked position extending between said bars in spaced relation from the pivotal axis thereof, whereby said bars are secured against relative pivotal movement, or to an unlocked position withdrawn from between said bars, whereby said bars are freed for relative pivotal movement, and
      (3) resilient means biasing said lock plate toward said locked position.

References Cited in the file of this patent

UNITED STATES PATENTS

| | | |
|---|---|---|
| 2,440,863 | Liggio | May 4, 1948 |
| 2,820,501 | Heuneman | Jan. 21, 1958 |
| 2,912,036 | Minutilla | Nov. 10, 1959 |
| 2,981,303 | Hayes | Apr. 25, 1961 |